United States Patent [19]

Lalancette et al.

[11] Patent Number: 4,631,183

[45] Date of Patent: Dec. 23, 1986

[54] PROCESS FOR THE DESTRUCTION OF TOXIC ORGANIC PRODUCTS

[75] Inventors: Jean M. Lalancette, Sherbrooke; Germain Belanger, St-Germain de Grantham, both of Canada

[73] Assignee: Hydro-Quebec, Quebec, Canada

[21] Appl. No.: 748,565

[22] Filed: Jun. 25, 1985

[51] Int. Cl.$^4$ .............. F23G 7/00; C01B 21/00; B01J 8/00; C10H 23/00

[52] U.S. Cl. .................. 423/659; 423/245; 423/240; 423/210; 210/909; 110/237

[58] Field of Search .......... 423/DIG. 12, 245, 240, 423/210 C, 210.5, 659; 210/906, 909, 915; 106/103; 501/155; 110/237

[56] References Cited

U.S. PATENT DOCUMENTS

| | | | |
|---|---|---|---|
| 4,116,830 | 9/1978 | Krogsrud | 210/909 |
| 4,246,255 | 1/1981 | Grantham | 423/240 |
| 4,331,088 | 5/1982 | Gold | 110/237 |
| 4,379,746 | 4/1983 | Norman et al. | 210/757 |
| 4,379,752 | 4/1983 | Norman | 210/909 |
| 4,447,262 | 5/1984 | Gay et al. | 423/DIG. 12 |
| 4,468,376 | 8/1984 | Suggitt | 423/481 |
| 4,514,294 | 4/1985 | Layman et al. | 210/909 |
| 4,526,677 | 7/1985 | Grantham et al. | 210/909 |
| 4,546,711 | 10/1985 | Kerwin | 110/246 |

*Primary Examiner*—Gary P. Straub
*Attorney, Agent, or Firm*—Cushman, Darby & Cushman

[57] ABSTRACT

There is disclosed a process for the destruction of toxic organic halogenated substances which comprises treating in a reaction chamber under a reductive atmosphere and at a temperature of from 1000° to 1600° C. a mixture of a toxic organic halogenated substance, carbon and a carbonate or bicarbonate of an alkali metal or of an alkaline earth metal whereby vapors of the alkali or alkaline earth metal are generated "in situ" to cause total degradation of the toxic organic halogenated substance into alkali or alkaline earth metal halide and carbon with the production of carbon monoxide which is subsequently oxidized into carbon dioxide.

14 Claims, No Drawings

PROCESS FOR THE DESTRUCTION OF TOXIC ORGANIC PRODUCTS

BACKGROUND OF THE INVENTION

1. Field of the Invention

This invention relates to a two steps process for the destruction of PCB by high temperature treatment of the halogenated structure in the presence of an alkali or alkaline earth metal generated "in situ", followed by oxidation of resulting products.

2. Prior Art

Polychlorinated biphenyls (PCB) and other polyhalogenated structures such as lindane or dioxin are known as highly toxic substances. Because of their inertness, the destruction of such materials is not easily achieved. The level of residual polyhalogenated material, after treatment, must be of the order of ppm or lower to satisfy the requirement of the environmental regulating agencies.

Several methods have been reported for the disposal of PCBs. Generally, three broad methods have been disclosed in the literature: combustion, catalytic oxidation and heating to a temperature of less than 150° C. in the presence of elemental sodium.

The simplest approach proposed has been the combustion of the material to be disposed of under a variety of conditions. For examples, Suggitt (U.S. Pat. No. 4,468,376) describes partial oxidation of the PCB in the presence of hydrocarbonaceous material, Rathjen et al (U.S. Pat. No. 4,140,066) reports the combustion of similar products in a specially designed combustion chamber, Robinson (U.S. Pat. No. 4,198,384) recommends partial oxidation followed by quenching of the reaction products and Meenan et al (U.S. Pat. No. 4,402,274), Winnen (U.S. Pat. No. 4,018,879) and Scheifley et al (U.S. Pat. No. 4,125,593) describe combustion processes with heat recovery.

Other authors have reported the use of different catalyst to promote the degradation of PCB, under oxidation conditions. For example, a Pt catalyst is used by Rasp et al, in U.S. Pat. No. 4,151,262, Kageyama in U.S. Pat. No. 4,053,557, and Kageyama in U.S. Pat. No. 3,972,979. A Cr catalyst is used in Johnson, U.S. Pat. No. 3,989,807 and Fe, Cu or Mn catalysts are used in Hyatt, U.S. Pat. No. 3,989,806. In some instances, reductive catalytic operations are indicated: Schafe (U.S. Pat. No. 3,892,818), Oricchio (U.S. Pat. No. 3,855,347) Brainerd et al (U.S. Pat. No. 2,803,669) or Wu-Chi Chen (U.S. Pat. No. 4,397,829).

Low temperature or room temperature processes have been reported calling upon alkali metal aromatic radical anion or sodium alcoholates as active reagents to degrade PCB in an inert atmosphere. Such approaches are described by Pytlewski et al (U.S. Pat. No. 4,417,977), Parker et al (U.S. Pat. No. 4,447,667) and Pytlewski et al (U.S. Pat. No. 4,430,208).

Oxidations of PCB in the presence of molten salts that are inert towards the reaction products are described by de Benckelaer (U.S. Pat. No. 3,969,490) and Grantham (U.S. Pat. No. 4,246,255).

Finally, dispersions of sodium are reported to react with PCB at low temperature by Norman et al (U.S. Pat. No. 4,379,746), Norman (U.S. Pat. No. 4,379,752) and Jordan (U.S. Pat. No. 4,340,471).

It has been found that each of the methods proposed by the prior art have different drawbacks. For example, generally speaking these methods either do not completely destroy the PCB or when they do the cost of operation is very high and requires in many cases the use of complex equipment with the handling of high volumes of materials derived from the breakdown of PCBs.

The reactions between PCB and an alkali such as sodium can be made essentially complete but the high cost of sodium or sodium alcoholate and the sensitivity of such reagents towards moisture which quite generally contaminates PCB thereby render their use less attractive.

On the other hand, the oxidation processes, whether direct or catalytic, suggested by the prior art, are not attractive because of the large investments required to insure the complete destruction of PCB.

It is also obvious that most of the methods proposed are deficient in safety and efficiency since large amounts of PCBs and other polyhalogenated materials are kept in storage at a very high cost, pending destruction.

Accordingly, it would appear highly desirable if a method for the destruction of PCBs and other polyhalogenated aromatics could be provided and which would combine efficiency and low cost of equipment and operation.

SUMMARY OF THE INVENTION

In accordance with the present invention, there is provided a novel, efficient and safe method for the destruction of toxic organic substances.

Essentially, the novel method of the present invention comprises treating under a reductive atmosphere a mixture of a toxic organic substance, carbon and a carbonate or bicarbonate of an alkali metal or of an alkaline earth metal at a temperature of from about 1000° to 1600° C. whereby vapors of the selected alkali or alkaline earth metal are generated "in situ" thereby degrading the organic toxic substances by chemical reaction into non-toxic components of low volatility and toxic gaseous component mostly carbon monoxide which are vented from the reaction chamber and oxidized to carbon dioxide in a separate combustion chamber.

More specifically, when the mixture of toxic organic substance, carbon and carbonate or bicarbonate of an alkali metal or of an alkaline earth metal is heated to from 1000° to 1600° C. in a reductive atmosphere, the carbon reacts with the carbonate or bicarbonate to provide carbon monoxide and alkali or alkaline earth metal vapors which react instantly with the halogen of the toxic polyhalogenated organic substance thereby forming a toxic volatile reaction product mixture and the corresponding alkali or alkaline earth metal halide which can be readily tapped off at the bottom of the reaction chamber in the molten form and the toxic volatiles are oxidized in a separate combustion chamber.

Alternatively, the process of the present invention comprises contacting vapors of alkali or alkaline earth metal at a temperature of from 1000° to 1600° C. with a toxic organic halogenated organic substance in the presence of carbon whereby the toxic substances are degraded into non-toxic solid components such as alkali or alkaline earth halogens and carbon and a secondary gaseous component mixture comprising mainly carbon monoxide which after venting in a combustion chamber can be readily oxidized to carbon dioxide.

DETAILED DESCRIPTION OF THE INVENTION

The expression "toxic organic halogenated substances" when used herein is intended to include aromatic organic products containing at least one halogen atom such as polychlorinated biphenyls, polyhalogenated aliphatic or alicyclic compounds containing up to 16 carbon atoms, such as lindane, and halogenated organic substances containing at least one heteroatom selected from phosphorus, sulfur, nitrogen, arsenic and combinations thereof such as lewisite, or monofluoroacetic acid.

The basic reaction used in the implementation of the invention calls for the action of an alkali or alkaline earth metal with the halogen carried by the polyhalogenated molecule in accordance with the following equation:

$$2R-X + M \rightarrow 2MX + R-R$$

$M = Na, K, Ca_{\frac{1}{2}}, Mg_{\frac{1}{2}}$
$X = $ halogen
$R = $ organic radical Several methods of destruction of PCBs are reported calling for the use of sodium, either as metal, hydroxide, alkoxide or combined with hydrocarbon. All these sources of sodium are expensive and sensitive to other contaminants such as air or water. In the present invention, alkali metal or alkaline earth metal are generated "in situ" by the reaction of a carbonate or bicarbonate, such as sodium carbonate, with carbon, at a temperature of at least 1000° C., according to the following illustrative equation:

$$Na_2CO_3 + 2C \rightarrow 3CO + 2Na$$

Under such conditions the vapors of the polyhalogenated hydrocarbon react instantly with the sodium to give sodium chloride, according to the following illustrative equation:

$$C_6Cl_6 + 6Na \rightarrow 6\ NaCl + 6C$$

With hydrocarbon still bearing hydrogen, pyrolysis will liberate the hydrogen from the carbon structure.

Under operational conditions, part of the molten sodium chloride is found at the bottom of the reactor while hydrogen, carbon monoxide, carbon particulates and some sodium and sodium chloride particulates are vented from the reactor. These volatiles are burned in a combustion chamber and the combustion gases washed with water to prevent emission of solids. Periodically, the bottom of the reactor is tapped to collect molten sodium chloride which is discarded.

Although sodium carbonate has been reported as useful for the destruction of PCB in the form of molted bath with other salts (U.S. Pat. Nos. 3,969,490, 4,246,255), there is no suggestion that a mixture of carbon and sodium carbonate can be used as a consumed reagent to combine chemically with polyhalogenated hydrocarbons.

The carbonates or bicarbonates which can be used in the process of the present invention are the carbonates of alkali metals and particularly of lithium, sodium and potassium, the others being too expensive to use. The carbonates or bicarbonates of alkaline earth metals can also be used and particularly those selected from calcium, barium and magnesium. When alkali metal carbonates or bicarbonates are used the ratio of alkali metal to the halogen content in the toxic organic substance is 1:1, while the ratio of alkaline earth metal carbonates or bicarbonates are used the ratio of alkaline earth metal to the halogen content in the toxic organic substance is 0.5:1.

The reaction chamber is made of graphite and can be heated by various methods such as resistance heating, arc heating or induction heating. The residence time of the vapors in the reactor is of 1 second to 40 seconds with a preferred value around 20 seconds. The combustion of the off gases is made in a refractory lined combustion chamber attached to a scrubbing column.

The field of application of the present invention is not limited to the destruction of polychlorinated hydrocarbons. It will be readily understood by those familiar in the art that at the temperatures of operation recommended, in the presence of the vapors of an alkali or alkaline earth metal, halogens bonded to organic structures, such as fluorine, bromine or iodine will react as readily as chlorine does. Other heteroelements or groups combined to organic structures will also be degraded entirely when submitted to such a treatment, said heteroelement including sulfur, phosphorus, arsenic and nitrogen bonded to organic molecules and nitrile or cyanide groups.

DESCRIPTION OF PROCESS

The following is a more detailed description of the invention.

The toxic substance to be destroyed is mixed with an alkali or alkaline earth metal carbonate or bicarbonate and carbon and fed to a reactor electrically heated and having a baffle system to avoid short circuit of the treatment. Alternatively a mixture of the alkali or alkaline earth metal carbonate or bicarbonate can be first mixed with carbon and fed to the reactor where alkali or alkaline earth metal vapors will be produced and the toxic substance is separately introduced in the reactor heated to a temperature of from 1000° to 1600° C.

The molten solids formed after the reaction are tapped from the bottom of the reactor and the flue gases are vented from the reaction chamber into a combustion chamber where air is admitted at the same time, the temperature in the combustion chamber being around 1000° C.

The reaction chamber is preferably lined with graphite or can be made of appropriate refractory material and is kept sealed by an insulated external steel lining.

The combustion products from the combustion chamber are cooled in a scrubbing tower and the steam and combustion gases are evacuated. The scrubbing water is recycled from a settling tank and the sludge is discarded periodically while water loss from evaporation is made up with fresh water.

The heat from the reaction in the combustion chamber is evacuated as steam and the scrubbing column operates at or near the boiling temperature of water.

The precipitate in the settling tank is made up mainly of graphite and alkali or alkaline earth metal halide which crystallize out. To insure constant and complete combustion in the combustion chamber, a pilot burner is kept in constant operation and fed with natural gas or other fuels.

PREFERRED OPERATIONAL CONDITIONS

Although a broad range of operational conditions can be used, pending among other things on the nature of the material to be destroyed, preferred operational conditions are a feed of 0.5 Kg/min. in a chamber having a volume of 2m$^3$ giving a residence time of the order of 20 sec. at a temperature of 1300°-1400° C. The ratio of alkali metal to halogen is 1:1 on a molar basis, and the ratio of alkaline earth metal to halogen is 0.5:1.

ADVANTAGES

There are many advantages to the novel process of the present invention. A first important advantage is that the process operates without the necessity of diluting the toxic organic halogenated substances so that the volumes that are handled are relatively small thus contributing to a substantial economy in the size and cost of the equipment required to operate the invention.

Another advantage is found in the fact that the degradation step being conducted in the presence of a strong reducing medium and at high temperatures the resulting reaction proceeds at high speed and is essentially complete so that there is no toxic residue left after treatment. A further advantage by operating in a reductive atmosphere i.e. in the absence of oxygen, is that there is obtained toxic gases of the nature of carbon monoxide or hydrogen or traces of alkali or alkaline earth metal which are readily oxidized to carbon dioxide water and metal oxide respectively, rather than toxic gases of the nature of dioxin found in trace amounts in other processes where oxygen is contacted with partly degraded halogenated organic compounds.

Finally, amongst other advantages there may be mentioned that the halogen atoms of the toxic organic halogenated compounds readily combine with the alkali or alkaline earth metal thus forming non-toxic salts.

EXAMPLES

The following examples illustrate the implementation of the invention.

Example 1

A graphite reactor having a cylindrical reaction chamber 30 cm in length and 2.5 cm in diameter was heated externally in an electrical furnace (glow bars) at 1500° C. A pellet made of one part of sodium carbonate and two parts of graphite carbon was introduced in the heated chamber. The weight of this pellet was 1.5 g and served to create an atmosphere of free elemental sodium inside the reaction chamber, prior to the addition of polyhalogenated material. This procedure is necessary, in a batch test, in order to prevent the vapors of the polyhalogenated product from bypassing the treatment. After waiting one minute after the addition of the first pellet, a second pellet of the mixture of sodium carbonate and carbon, in the ratio two to one (1.370 g) and previously impregnated with benzene hexachloride (1.029 g) is introduced in the reactor. The volume of the reaction chamber (147 cm$^3$) can hold the vapors thus generated by the addition of the second pellet. These vapors are left static at 1500° C. in the graphite reactor for 20 seconds and then flushed rapidly by a stream of argon at a rate of 500 ml/second, through the exit of the reactor where any vapors are trapped by a stainless steel condenser followed by two bubblers filled with toluene. The trap is washed with toluene and the combined toluene analyzed for hexachlorobenzene by vapor phase chromatography. This analysis establishes that 99.9% of the injected hexachlorobenzene had been destroyed by the treatment.

The same experiment was repeated except that the vapors were flushed by a stream of argon at a rate of 500 ml/second through the exit of the reactor and the vapors were directed to a combustion chamber. The combustion chamber was flushed with air and the combined gases were directed to an exit where they were ignited upon their exit thereby converting the carbon monoxide to carbon dioxide.

Example 2

The procedure was similar to Example 1 except that the time of residence was one second. The percentage of destruction was then 99.99%.

Example 3

The procedure was similar to Example 1 except that the polyhalogenated material used was PCB grade 1243. The percentage of destruction was 99.999%.

Example 4

The procedure was similar to Example 1 except that the polyhalogenated material used was PCB grade 1260 containing 30% of trichlorobenzene as diluent. The percentage of destruction was 99.9999%.

Example 5

The procedure was similar to Example 1 except that the temperature used was 1250° C. The reactor being made of stainless steel 316 with a capacity of 150 ml, the polyhalogenated material being PCB grade 1243. The percentage of destruction noted was 99.9999%.

What is claimed is:

1. Process for the destruction of toxic organic halogenated substances which comprises treating in a reaction chamber under a reductive atmosphere and heated by a member of the group consisting of resistance heating, arc heating, and induction heating at a temperature of from 1000° to 1600° C. a mixture of a toxic organic halogenated substance, carbon and a carbonate or bicarbonate of an alkali metal and generating "in situ" to cause essentially total degradation of the toxic organic halogenated substance into alkali metal halide and free carbon and carbon monoxide exit gas containing at least some free alkali metal which carbon monoxide is subsequently oxidized into carbon dioxide.

2. The process of claim 1, wherein the reaction time is from 1 to 40 seconds.

3. The process of claim 1, wherein the reaction time is about 20 seconds and the reaction temperature is about 1500° C.

4. The process of claim 1, wherein carbonate or bicarbonate of the alkali metal is premixed with the carbon and the mixture is impregnated with the toxic organic halogenated substance and introduced in the reaction chamber.

5. The process of claim 4, wherein the gaseous components obtained from the reaction are vented from the reaction chamber to a combustion chamber.

6. The process of claim 1, wherein a mixture of the carbonate or bicarbonate of the alkali metal and carbon is pelletized and introduced in the reaction chamber while the toxic organic halogenated substance is simultaneously introduced in the reaction chamber by a different orifice.

7. The process of claim 1, wherein the reaction chamber is lined with graphite.

8. The process of claim 7 wherein the alkali metal is sodium.

9. The process of claim 1 carried out in the absence of oxygen.

10. The process of claim 9 wherein at least 99.9% of the toxic organic halogenated substances are degraded.

11. The process of claim 1 wherein at least 99.9% of the toxic organic halogenated substances are degraded.

12. The process of claim 1 consisting essentially of carrying out the process wherein the materials employed in the reductive atmosphere consist essentially of the toxic organic halogenated substance, carbon and a carbonate or bicarbonate of an alkali metal.

13. The process of claim 1 consisting of carrying out the process wherein the materials employed in the reductive atmosphere consist of the toxic organic halogenated substance, carbon and a carbonate or bicarbonate of an alkali metal.

14. The process of claim 1 wherein the alkali metal is sodium.

* * * * *

UNITED STATES PATENT AND TRADEMARK OFFICE
CERTIFICATE OF CORRECTION

PATENT NO. : 4,631,183

DATED : December 23, 1986

INVENTOR(S) : Lalancette et al.

It is certified that error appears in the above-identified patent and that said Letters Patent is hereby corrected as shown below:

Claim 1, line 8, after "generating", insert

--vapors of alkali metal--.

Signed and Sealed this

Tenth Day of November, 1987

Attest:

DONALD J. QUIGG

Attesting Officer

Commissioner of Patents and Trademarks